ём

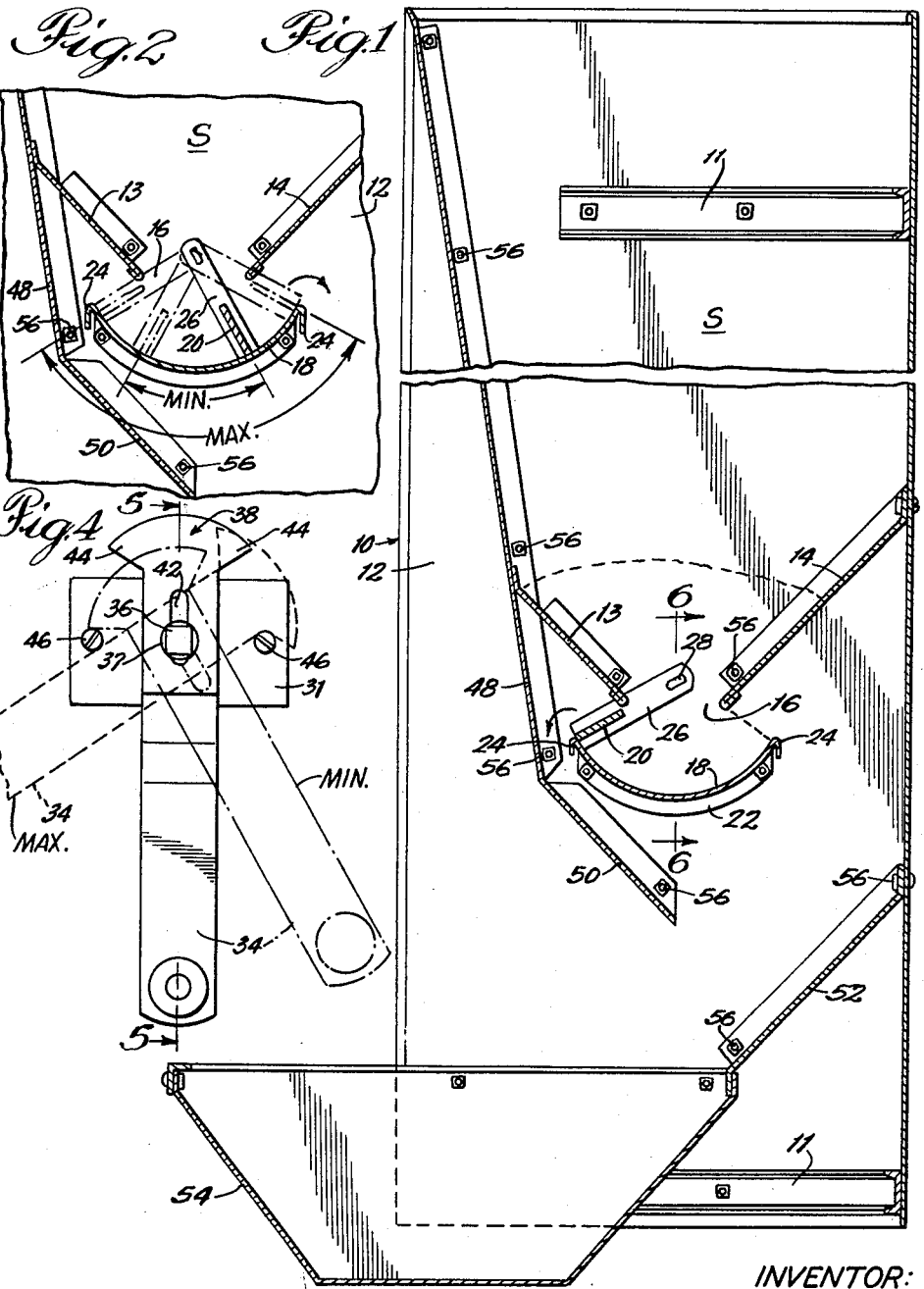

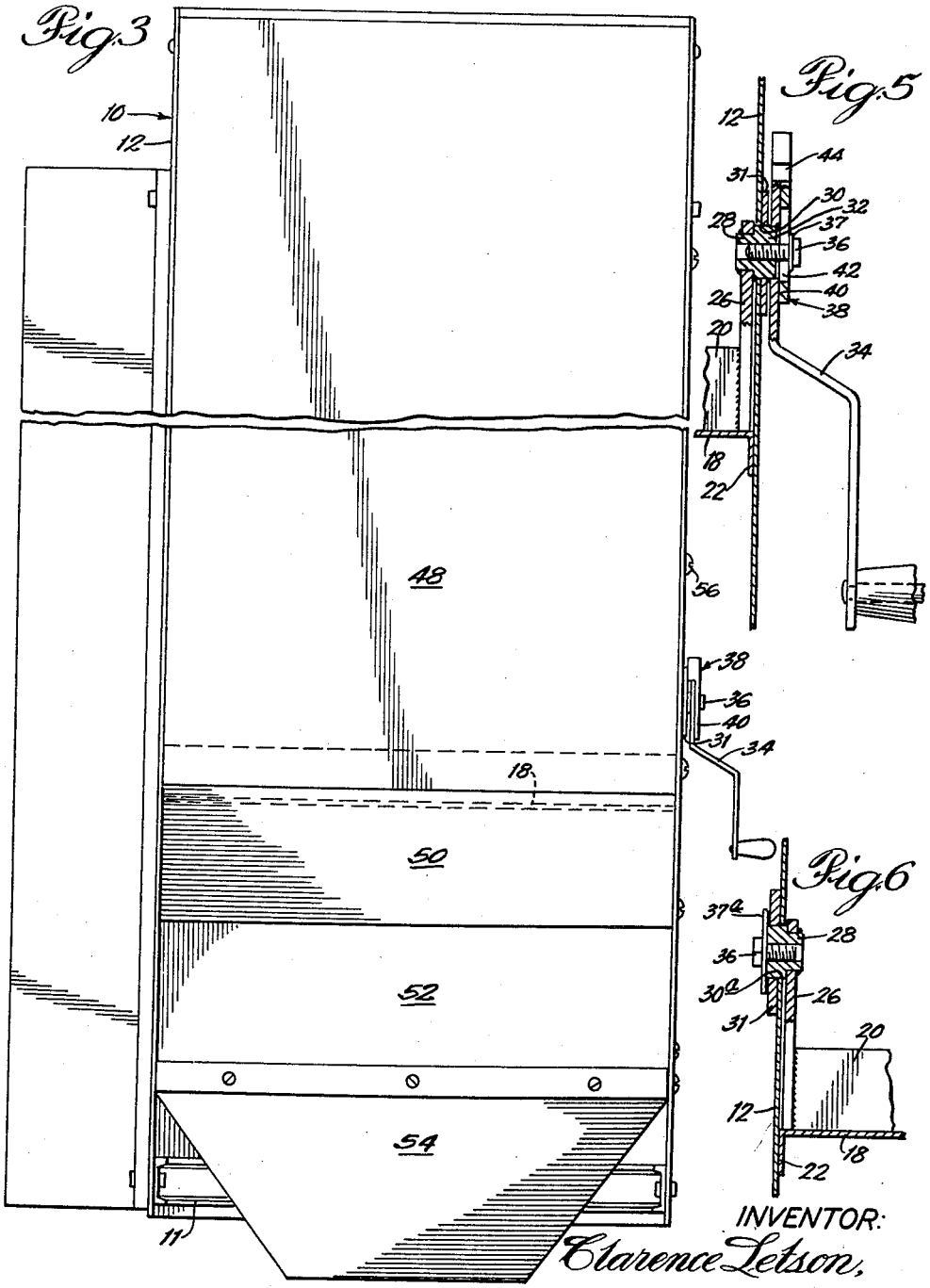

United States Patent Office 3,073,487
Patented Jan. 15, 1963

3,073,487
OSCILLATING FEED CONTROL FOR MILKING PARLOR STALLS
Clarence E. T. Letson, Cedar Falls, Iowa, assignor to Clay Equipment Corporation, Cedar Falls, Iowa, a corporation of Iowa
Original application July 28, 1958, Ser. No. 751,298, now Patent No. 3,001,410, dated Sept. 26, 1961. Divided and this application Jan. 9, 1961, Ser. No. 81,494
2 Claims. (Cl. 222—282)

This invention relates to an improved feed control for use in discharging predetermined, metered amounts of feed from a feed storage hopper. This application is a division of my copending application, Serial No. 751,298, filed July 28, 1958, now Patent No. 3,001,410, granted September 26, 1961.

Prior attempts have been made to provide means for delivering predetermined, metered, amounts of feed from a feed hopper to a feed bowl. One type of installation where such a device is highly useful is in milking parlors, where it is common practice to deliver feed to the cow at the time that it is being milked. It is highly desirable that the amount of feed so delivered be regulated, as too little feed would not satisfy the animal, and too much feed would result in eventual overflowing of the feed bowl and in waste. Considering the number of animals that are serviced per hour in a milking parlor, it is practically physically impossible for an attendant to check the amount of feed being delivered to all the animals being milked. Hence, it is desirable that the dispensing of feed be as automatic as possible.

Certain prior devices have utilized a paddle-wheel type feed dispenser at the lower end of a feed hopper, which operates to receive feed into the upper chambers of the paddle wheel and discharge the feed by gravity from the lower chambers, as the paddle wheel is rotated. There exist a number of deficiencies with this prior system. For one, depending on the coarseness of the feed, the amount delivered to each chamber of the paddle wheel varies. Furthermore, the V-shaped chamber opening between paddles is often so narrow that it is difficult to fill completely, as the wheel is rotated. Furthermore, it is difficult to vary the amount of feed being discharged, as the variation available involves multiples of a single chamber's capacity.

Thus, one object of this invention is to provide an improved feed discharge means for delivering therefrom metered amounts of feed.

Another object of this invention is to provide a metered feed-delivery device which is characterized by its simplicity of construction and efficiency and accuracy of operation.

A further object of this invention is to provide a metered feed-delivery means which may be selectively varied continuously over a feed-delivery range, thereby providing for more accurate dispensing of feed from the device.

Further objects and advantages of this invention will become apparent as the following description proceeds, and the features of novelty which characterize this invention will be pointed out with particularity in the claims annexed to and forming part of this specification.

A preferred embodiment of the invention is shown in the accompanying drawings, in which:

FIGURE 1 is a side cross-section view of the feed-dispensing means of this invention, showing the feed-dispensing paddle at one end of its range of swing;

FIGURE 2 is a fragmentary view of a portion of FIGURE 1 showing the feed-dispensing paddle at the opposite end of its range of swing;

FIGURE 3 is an elevation view taken looking from the left of FIGURE 1;

FIGURE 4 is an enlarged detail elevation view of the handle control for the feed-discharge paddle;

FIGURE 5 is a cross-section view taken on line 5—5 of FIGURE 4 showing the details of mounting of the handle end of the paddle on the hopper structure; and FIGURE 6 is a cross-section view taken on line 6—6 of FIGURE 1 and shows the details of mounting of the other end of the paddle on the hopper structure.

Referring now to the drawings, there is shown in the figures a storage hopper for cattle feed generally indicated at 10, having upright walls of sheet metal that may be appropriately rigidified by U-shaped channel frame means, such as those shown generally at 11 adjacent the top and bottom of the sheet metal hopper. The storage hopper 10 includes two upright, spaced, end walls 12 and other upright walls transverse to the end walls 12 and cooperating to define a feed-receiving space S, and providing downwardly and inwardly inclined transverse wall portions 13 and 14. The lower edges of transverse walls 13 and 14 are spaced apart to define a bottom opening 16 in the supply hopper which extends along the width of hopper space S between the end walls 12. The arrangement is such that feed which is stored in the upper portion of hopper 10 continually passes by force of gravity through the bottom opening 16.

Positioned directly below the bottom hopper opening 16 and spaced therefrom, within the hopper 10, is a support wall 18 which extends transversely between the end walls 12 coextensive with opening 16, and which is of a length, transverse to the spacing of end walls 12, greater than the width of the hopper opening 16. The said length of the support wall 18 is selected relative to the width of the hopper opening 16 and to the spacing of the support wall 18 below the hopper opening 16 such that the feed passing downwardly through the hopper opening 16 will be supported on said support wall at its angle of repose and will not spill over the ends of the support wall.

A discharge paddle 20 is positioned in the space between the bottom opening 16 of the hopper means and the upper surface of the support wall 18. The discharge paddle 20 is adapted to be oscillated over the upper surface of the support wall 18, and substantially between the ends of the said support wall 18, to effect discharge of feed over the edges of the support wall 18, depending upon the direction of stroke of the discharge paddle. While the support wall 18 could be generally planar in form, and the discharge paddle 20 could be oscillated substantially horizontally between its two extreme positions, more specifically the support wall 18 is shown to be in the form of a segment, or arc, of a circle and the arcuate length of the arcuate support wall 18 is, of course, selected as pointed out hereinabove, so that the angle of repose of the feed being fed by gravity from the hopper means will not effect spillage of feed over the edges of the arcuate support wall. The support wall 18 is mounted between the end walls 12 by means of downwardly extending flanges 22 on wall 18 which are secured to the end walls 12. The edges 24 of the support wall 18 are turned over and downwardly to provide a smooth edge over which the feed is to be discharged by the discharge paddle 20. It will readily be understood that when paddle 20 sweeps in one direction it forces feed ahead of it over one edge of wall 18, while more feed passes downwardly through opening 16 and fills in behind paddle 20, resting on wall 18.

The discharge paddle 20 is elongated and is of substantially the same axial length as the arcuate support wall 18. The ends of the discharge paddle 20 are appropriately secured, such as by welding or the like, to a pair of radial extending arms 26 which are keyed or welded onto studs 28 that are positioned inwardly of the hopper and walls 12. The studs 28 are carried by bearings 30 and 30a which, in turn, are appropriately pivotally supported in opposed apertures formed in the end walls 12. The bearings 30 and 30a carry bearing washers 31 for engagement with the outer sides of walls 12 to properly position the bearings in the walls. The axis of bearings 30—30a coincide with the center of curvature of arcuate support wall 18.

One of the bearings, 30, seen in FIGURE 5, has an outwardly extending non-circular portion 32 to which an elongated actuating handle 34 is keyed, so as to effect a driving connection between handle 34 and the discharge paddle 20. The bearing 30 is centrally threaded and carries therein a threaded clamping bolt 36. A stop head generally indicated at 38 is provided in association with the handle 34, and is clamped in position through washer 37 under the head of bolt 36. The other bearing, 30a, seen in FIGURE 6, may be connected to an actuator as is disclosed in certain modified forms in my Patent No. 3,001,410, but as shown in FIGURE 6, the bearing 30a is centrally threaded to carry a threaded clamping bolt 36a whose head engages washer 37a for retention of washer 31.

The stop head 38 has a shank portion 40 having an elongated slot 42 therein, and the stop head also has a pair of outwardly extending ears 44, as best seen in FIGURE 4. The stop head is arranged to cooperate with a pair of stop studs 46 that are carried on the hopper 10 and which extend outwardly of the end wall 12 adjacent which the handle 34 is located. The stop studs 46 are positioned to be engaged by a portion of the stop head 38, to define limits of the pivoting of the handle 34, and of the discharge paddle 20 connected thereto, about the longitudinal axis of the bearing means 30—30a. The stop head 38 is adjustable relative to the handle 34 and radially of the threaded bolt 36 which serves to clamp said head 38 in its selected positions. By radially adjusting the stop head 38 relative to the shank of bolt 36, the range of movement of the handle 34, and of the discharge paddle 20, may be varied, so as to effect a discharge of a variable amount of feed off the ends of support wall 18, for each swing of the handle 34 in one or the other of the opposite directions in which the handle is arranged to swing.

The stop head 38 may be adjusted to provide the specific amount of weight of feed that is desired, and the stop head may be appropriately calibrated as to its radial position relative to the clamping bolt 36, in terms of pounds of feed to be discharged upon each stroke or swing of the handle 34. FIGURE 4 illustrates in dash lines the maximum range of the swing of the handle 34, depending upon the position of the stop head 38, and FIGURE 4 also illustrates, in dot-and-dash lines, the minimum range of swing of the handle 34 and of the associated discharge paddle 20. FIGURE 1 illustrates the discharge paddle 20 at one end of its maximum swing, and the adjacent arrow indicates the direction of movement of feed being discharged. FIGURE 2 illustrates the discharge paddle at the opposite end of its minimum swing with the adjacent arrow indicating the direction of movement of feed discharge.

Positioned below the discharge edges of the support plate 18, there are provided inclined wall means for directing the feed that is discharged by the paddle 20. As shown in FIGURE 1, there is a first inclined wall 48 positioned in relatively close, spaced relation to the left-hand edge of support wall 18, and there is an inwardly inclined extension wall 50 which projects under and inwardly of the support wall 18 substantially to a point below the axis of pivoting of the discharge paddle 20. A second inclined wall 52 is provided, spaced below the lower terminus of wall 50 and also spaced below the right-hand discharge edge of support wall 18.

The arrangement is such as to provide a series of stepped, vertically spaced walls which ultimately cause all the feed that is discharged over the left or right hand edges of the support wall 18 to be directed into a hopper-like feeding bowl generally indicated at 54. The arrangement of the hopper-like bowl 54, together with the inwardly inclined walls 48 and 50, provides an enlarged recess, which is best seen in FIGURE 1, into which an animal's head may be introduced so that the animal will have access to the feed carried by the hopper-like feeding bowl 54.

The entire arrangement disclosed in FIGURES 1 to 3 may be formed of sheet metal parts and the various transverse walls, such as walls 13, 14, 48, 50 and 52, extending between the spaced end walls 12 are provided with flanges for attachment to the inner sides of end walls 12, and the flanges may be rigidly secured to the end walls 12 by means of assembly bolt means 56, thereby providing a substantially rigid structure.

It will be seen that the effective height of the paddle 20 is just slightly less than the spacing between the lower terminus of the inclined walls 13 and 14 and the upper surface of the support wall 18, so that there is sufficient clearance between said parts to permit oscillation of the paddle 20 in the space defined between the support wall 18 and the lower terminus of the hopper means surrounding opening 16. At the same time, there should be as little clearance as necessary so that there is no spillage of feed over the upper edge of the paddle 20 and outwardly of the support wall 18.

The inclined side walls 13 and 14 which are adjacent the bottom opening 16 in the hopper are disposed at an angle to the horizontal which is steeper than the normal angle of repose of the feed which is stored within the hopper, thereby preventing bridging over of the hopper opening 16 and insuring continuous flow by gravity of the feed through the hopper opening 16.

Thus, and it will be seen from the foregoing, there has been provided a novel type feed dispenser having a feed dispenser which is arranged to dispense feed when it is moved in either of a pair of opposite directions, and there is also provided means associated therewith for varying, over a continuous range, the amount of feed being dispensed by a single actuation of the feed dispenser, so that a milking house attendant may selectively adjust the feed dispenser to dispense the proper amount of feed to an animal being milked.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States is:

1. An intermittent feed control means for a feed dispensing device for dispensing selective predetermined amounts of cattle feed from a hopper means having a bottom opening through which feed continuously passes under force of gravity, an elongated unitary arcuate support wall spaced below the bottom opening in the hopper means and adapted to receive and support thereon at its angle of repose the feed that passes from the hopper means, and an elongated generally planar paddle of substantially the same axial length as said arcuate support wall positioned in the space between the open bottom of the hopper means and the arcuate support wall; said feed control means comprising, in combination: means mounting said paddle for oscillation generally about a longitudinal axis which coincides with the center of curvature of said arcuate support wall, an intermittently-actuated control arm connected to said paddle for effecting oscillation of said paddle to effect selective discharge of feed over one or the other ends of said arcuate support wall, stop means on said hopper means fixed relative to said longitudinal axis, a selectively adjustable stop head having opposed ears thereon carried on and movable with said control arm and arranged to engage said stop means to limit the angle of oscillation of said control means about its pivot axis, and means for selectively adjusting the stop head on said control arm and radially of said longitudinal axis so as to reposition the stop head relative to said stop means for varying the amount of feed selectively discharged by the oscillation of the feed paddle.

2. A feed dispenser for cattle comprising, in combination: upright hopper means in which a supply of cattle feed is stored, the lower end of said hopper means defining an elongated opening through which feed passes under force of gravity; an elongated unitary arcuate support wall spaced below said opening in the hopper means for receiving and supporting thereon at its angle of repose an amount of feed that has passed from the hopper means; elongated paddle means positioned in the space between the open bottom of the hopper means and the arcuate support wall comprising a substantially planar paddle; means mounting the paddle for oscillation about a longitudinal axis coinciding with the center of curvature of said arcuate support wall; an elongated control arm extending radially of the axis of oscillation of the paddle and connected to said paddle to move therewith and affording means for effecting selective oscillatory movement of said paddle to discharge feed over an edge of said arcuate support wall; a stop member carried on said hopper means and positioned to limit the swing of said control arm and adapted to be engaged by said control arm so as to control the amount of feed discharged by a swing of said paddle; adjustment means including one of said control arm and stop member being adjustable relative to the other to selectively vary the range of swing of the control arm and of the paddle movable therewith, the said one adjustable member having an elongated slot therein, and mounting means for said adjustable member including a threaded bolt extending through said elongated slot and a manually operable clamping member on said bolt for either selectively releasing the adjustable member, to permit repositioning, or for frictionally clamping the adjustable member in the selected position, thus varying the connecting point of the adjustable member and adjusting the sweep of the paddle.

References Cited in the file of this patent
UNITED STATES PATENTS

| | | |
|---|---|---|
| 1,546,069 | Harper | July 14, 1925 |
| 2,334,337 | Lawry et al. | Nov. 16, 1943 |
| 2,495,906 | Porter | Jan. 31, 1950 |
| 2,620,946 | Auer | Dec. 9, 1952 |